Feb. 28, 1933.    F. ACKERMAN    1,899,491
AUTOMOBILE LIFT
Filed June 11, 1931
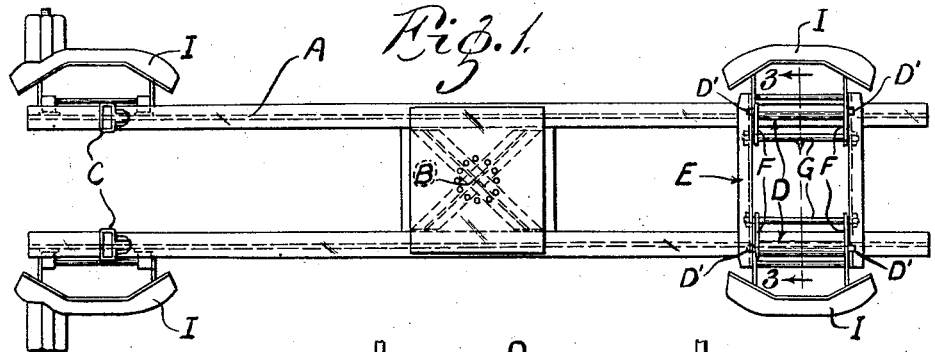
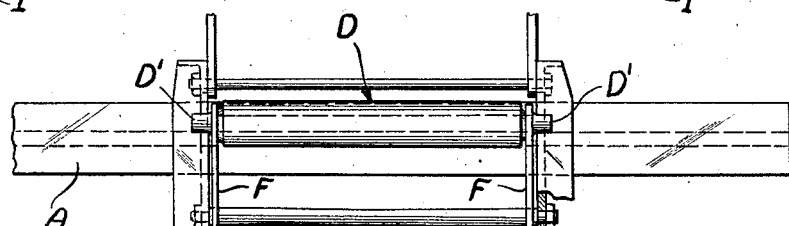
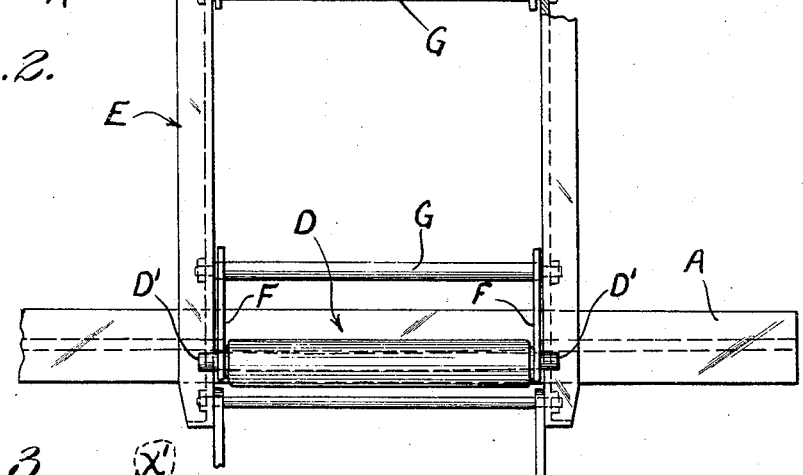
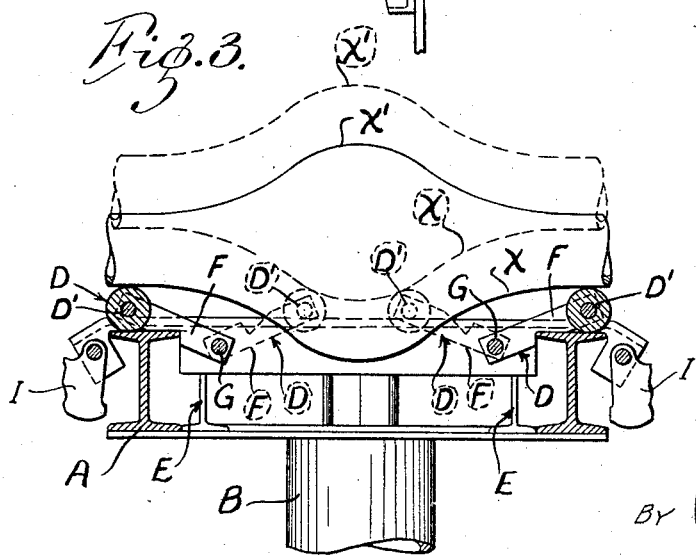
INVENTOR:
FRANK ACKERMAN
By Bakewell
ATTORNEYS Patented Feb. 28, 1933

1,899,491

UNITED STATES PATENT OFFICE

FRANK ACKERMAN, OF ST. LOUIS, MISSOURI, ASSIGNOR TO CURTIS MANUFACTURING COMPANY, OF WELLSTON, MISSOURI, A CORPORATION OF MISSOURI

AUTOMOBILE LIFT

Application filed June 11, 1931. Serial No. 543,543.

This invention relates to automobile lifts, such as are now used extensively for supporting or sustaining an automobile or other vehicle in an elevated position, so as to facilitate the operation of lubricating, inspecting or working on the chassis of the vehicle.

Automobile lifts of the type in which the wheels of the vehicle are free to turn when the vehicle is in an elevated or raised position, usually consist of a platform or chassis supporting structure carried by a vertically-movable piston, and provided with devices that are adapted to engage the front and rear axles of the vehicle so as to firmly support the vehicle when the platform is raised. In lifts of the type mentioned it is common practice to equip the platform of the lift with two front axle supports spaced relatively far apart, and a rear axle support located at or adjacent to the longitudinal axis of the platform so that it will serve as a bearing or support on which the differential case of the rear axle housing of the vehicle can rest. This type of chassis supporting means enables practically all makes of automobiles of average size to be reliably supported on the platform of the lift without interfering with or damaging truss rods, shock absorbers or other attachments on the rear axle housing, but it is not particularly adapted for use with wide bodied vehicles or with top-heavy vehicles, due to the fact that the rear axle of the vehicle is supported solely by a device or means located at or adjacent to the longitudinal center of the platform, and thus has a tendency to rock or tilt on said center supporting means. Accordingly, automobile lifts whose platforms are equipped with a chassis supporting means of the type just referred to are usually supplied with auxiliary rear axle supports that are adapted to be manually set or positioned when the lift is to be used to raise a wide bodied or top-heavy vehicle, so as to provide two widely spaced supporting devices for the rear axle that co-operate with the front axle supports to form in effect a four-point support for the vehicle.

The main object of my invention is to overcome the necessity of furnishing auxiliary rear axle supports or supporting brackets of special design, for automobile lifts of the type in which the platform is provided with chassis engaging devices disposed so as to form in effect a triangular support for the vehicle, namely, spaced supports for the front axle, and a centrally-disposed supporting means on which the differential case of the rear axle housing rests.

Another object of my invention is to provide an automobile lift that is equipped with chassis-engaging devices, permanently combined with the platform and constructed so that they can be used to form either a four-point support that will sustain a wide-bodied or top-heavy vehicle without danger of the vehicle tilting or rocking, or a triangular support that will safely sustain the average vehicle.

To this end I have devised a novel rear axle supporting means for automobile lifts, that is adapted to be adjusted or arranged in one position, wherein it serves as a center support or bearing located at or adjacent to the longitudinal center of the platform on which the differential case of the rear axle housing of a vehicle may be supported, and adapted to be adjusted or arranged in a different position, wherein it forms two widely spaced supports or bearings located at opposite sides of the longitudinal axis of the platform, on which the rear axle of a wide-bodied or top-heavy vehicle may be reliably supported. Said rear axle supporting means can be constructed in various ways without departing from the spirit of my invention, and it may be used in connection with various types and kinds of automobile lifts.

Figure 1 is a top plan view of an automobile lift constructed in accordance with my present invention.

Figure 2 is an enlarged fragmentary top plan view of said lift; and

Figure 3 is a transverse sectional view, taken on the line 3—3 of Figure 1.

In the accompanying drawing which illustrates one form of my invention, A designates as an entirety the platform or chassis supporting structure of an automobile lift that is carried by a vertically-movable piston B or other suitable means for raising and lowering said platform. The platform A, which may be of any preferred construction, is provided adjacent one end with a pair of spaced chassis-engaging devices C located at opposite sides of the longitudinal axis of the platform and adapted to serve as supports for the front axle of the vehicle to be raised, and said platform is also provided with a rear axle supporting means which is of such construction that it can be used in conjunction with the front axle supports C to form either a four-point support for a vehicle that is to be raised, or a supporting means that comprises two spaced front axle supports and a centrally-disposed rear axle support on which the differential case of the rear axle housing rests. Preferably, said rear axle supporting means is formed from two devices D that are adapted to be arranged in one position, shown in full lines in Figure 3, wherein they form two widely spaced bearings or supports for the rear axle housing $x$ of a vehicle, and adapted to be arranged in another position, shown in broken lines in Figure 3, wherein they co-operate with each other to form in effect a single central support on which the differential case $x'$ of the rear axle housing $x$ of a vehicle may be supported. Accordingly, when the devices D are arranged or set in the position shown in full lines in Figure 3, they co-act with the front axle supports C to form a four-point support on which a wide-bodied or top-heavy vehicle may be sustained without the necessity of employing additional or auxiliary supporting devices, and when said devices D are arranged or set in the position shown in broken lines in Figure 3, they co-act with the front axle supports C to form practically a triangular support on which an automobile of average dimensions may be reliably supported.

In order that the distance between the front axle supports and the rear axle supporting means may be varied to adapt the lift to automobiles of different length wheel base, the devices D are mounted on or carried by a sled or other shiftable structure E mounted on the platform A in such a manner that it can be moved longitudinally of the platform. It is not essential, however, that the devices D be mounted on a sled or longitudinally-shiftable supporting structure, for if desired, they may be mounted directly on the platform A, or combined with said platform in such a way that they cannot be adjusted longitudinally relatively to the front axle support C.

In the particular form of my invention herein illustrated the devices D consist of two rollers arranged in parallel relation and disposed longitudinally of the platform A. Each of said rollers is mounted on a shaft $D'$ carried by a pair of swinging arms or carriers F pivotally mounted on the sled E, and the two pairs of arms F are so proportioned and arranged that when they are set in the position shown in full lines in Figure 3, the rollers D carried by same will be located near the outer edges of the platform, or at least some distance away from the longitudinal center of the platform. When the arms F are swung inwardly into the position shown in broken lines in Figure 3, the rollers D carried by said arms will be located near enough to the longitudinal center of the platform to co-operate with each other to form in effect a single support or bearing on which the differential case $x'$ of the rear axle housing $x$ of a vehicle may be supported when the platform A is in its elevated position. Longitudinally-disposed bolts or rods G that pass through the transverse cross pieces of the sled E are preferably used to support the swinging arms F, and said arms F are so shaped and proportioned that when they are swung outwardly to space the rollers D relatively far apart, said rollers will rest upon the longitudinally-disposed I-beams that form the side members of the platform A. When the arms F are swung inwardly to cause the rollers D to act as a center support, as shown in broken lines in Figure 3, the end portions of the shafts $D'$ on which the rollers D are journalled, will lap over and rest upon the transverse members of the sled E, thereby causing the load imposed upon the rollers D to be transmitted directly to the side members of the platform A, due to the engagement of the roller supporting shafts $D'$ with the transverse members of the sled E which rest upon the side members of the platform, as shown in Figure 3.

From the foregoing it will be seen that I have provided a novel rear axle supporting means for automobile lifts that is adapted to be used with all makes and kinds of automobiles and trucks, and which can be changed easily to form either a center rear axle support or a pair of rear axle supports spaced relatively far apart, thereby enabling the platform of an automobile lift to be provided with a self-contained means that may be used to form a triangular support for vehicles of average size or a four-point support for wide-bodied or top-heavy vehicles, simply by shifting the arms F which carry the devices D. While I prefer to use rollers to form the elements D of my improved rear axle support, owing to the fact that a pair of parallel rollers will permit the differential case of the rear axle housing of an automobile to automatically center itself on the support, it is not essential that the elements D consist of rollers, and as previously explained, it is not essential to the successful operation of my invention that the devices D be mounted on a sled or other longitudinally-shiftable supporting structure.

In Fig. 1 of the drawing the reference characters I designate wheel-engaging members mounted in such a way that when the platform is in its lowered position, said wheel-engaging members will co-act with the wheels of the vehicle to be raised, to properly center the vehicle with relation to the platform, preparatory to the upward movement of the platform. When the platform moves upwardly, the wheel-engaging members I move or may be moved out of engagement with the wheels of the vehicle, so as to permit the wheels to turn freely. The wheel-engaging members I, however, form no part of my present invention.

Having thus described my invention, what I claim as new and desire to secure by Letters Patent is:

1. A rear axle supporting means for automobile lifts, comprising devices that are adapted to co-act with each other to form a support for the differential case of the rear axle, and rockable members that carry said devices, said rockable members being adapted to be moved so as to cause said devices to be spaced relatively far apart at opposite sides of the differential case.

2. An automobile lift, comprising a vertically-movable platform, a pair of pivotally mounted arms carried by said platform, and rear axle supporting devices on said arms, said arms being adapted to be moved to arrange said devices either adjacent to longitudinal center of the platform or adjacent the side edges of the platform.

3. An automobile lift, comprising a platform, a pair of longitudinally-disposed, parallel rollers on said platform that are adapted to serve as a support for the differential case of the rear axle housing of a vehicle, and shiftable carriers that sustain said rollers, said carriers being adapted to be moved so as to arrange said rollers in a position to engage a rear axle housing at points beyond the differential case.

4. An automobile lift, comprising a vertically-movable platform, a longitudinally-shiftable structure on said platform, rear axle supporting devices, and pivotally mounted arms on said shiftable structure that carry said devices.

5. An automobile lift, comprising a vertically-movable platform, a longitudinally-shiftable structure on said platform, a pair of parallel devices disposed longitudinally of the platform and adapted to serve as a support for the central portion of the rear axle of a vehicle, and pivotally-mounted arms on said shiftable structure that carry said devices.

6. In an automobile lift, a vertically-movable piston, a platform carried by said piston and comprising side members, pivotally mounted arms on said platform arranged so as to rock on axes located between and parallel to the side members of the platform, and rear axle supporting devices carried by said arms.

FRANK ACKERMAN.